United States Patent [19]

Robertson et al.

[11] Patent Number: 5,770,669
[45] Date of Patent: Jun. 23, 1998

[54] SILCONE-CONTAINING POLYMER HAVING OXYGEN PERMEABILITY SUITABLE FOR OPHALMIC APPLICATIONS

[75] Inventors: J. Richard Robertson, Alpharetta; Cheryl R. Allen, Berkeley Lake, both of Ga.

[73] Assignee: CIBA Vision Corporation, Duluth, Ga.

[21] Appl. No.: 630,802

[22] Filed: Apr. 10, 1996

Related U.S. Application Data

[63] Continuation-in-part of Ser. No. 349,646, Dec. 5, 1994, abandoned.

[51] Int. Cl.[6] ................................................. C08F 30/08
[52] U.S. Cl. ............................... 526/279; 351/160 H
[58] Field of Search .......................... 526/279; 351/160 H

[56] References Cited

U.S. PATENT DOCUMENTS

| | | | |
|---|---|---|---|
| 4,139,513 | 2/1979 | Tanaka et al. | 260/29.6 |
| 4,182,822 | 1/1980 | Chang | 526/264 |
| 4,248,989 | 2/1981 | Novicky | 526/264 |
| 4,306,042 | 12/1981 | Neffe | 526/75 |
| 4,525,563 | 6/1985 | Shibata et al. | 526/279 |
| 4,640,941 | 2/1987 | Park et al. | 523/107 |
| 4,871,785 | 10/1989 | Proix | 523/106 |
| 4,921,956 | 5/1990 | Molock et al. | 544/165 |
| 4,929,692 | 5/1990 | Goldenberg | 526/247 |
| 4,933,406 | 6/1990 | Anan et al. | 526/245 |
| 5,057,578 | 10/1991 | Spinelli | 525/278 |
| 5,115,056 | 5/1992 | Mueller et al. | 526/243 |
| 5,314,960 | 5/1994 | Spinelli et al. | 525/280 |
| 5,334,681 | 8/1994 | Mueller et al. | 526/243 |
| 5,358,688 | 10/1994 | Roberton | 422/28 |

FOREIGN PATENT DOCUMENTS

| | | |
|---|---|---|
| 108886 | 9/1983 | European Pat. Off. . |
| 0330617 | 2/1989 | European Pat. Off. . |
| 0406161A2 | 6/1990 | European Pat. Off. . |
| 0493320A2 | 12/1991 | European Pat. Off. . |
| 9305085 | 9/1992 | WIPO . |

*Primary Examiner*—Melvyn I. Marquis
*Attorney, Agent, or Firm*—R. Scott Meece; Michael U. Lee

[57] ABSTRACT

Copolymers formed from dimethacrylates of polyalkylene glycols and vinylic reactive silicones having up to 20 silicon atoms in the substantial absence of additional cross-linking agents. The copolymers may include a hydrophilicity-modifying monomer. The preferred silicon is TRIS (i.e., 3-methacryloxypropyl tris(trimethylsiloxy) silane), while the preferred polyalkylene glycol is polypropylene glycol dimethacrylate. The copolymers are especially suited to use in the fabrication of soft contact lenses because of the good durability and high oxygen permeability and transmissibility. Oxygen transmissibilities of greater than 70 barrers/mm are preferred.

24 Claims, No Drawings

SILICONE-CONTAINING POLYMER HAVING OXYGEN PERMEABILITY SUITABLE FOR OPHALMIC APPLICATIONS

This application is a continuation-in-part application Ser. No. 08/349,646 filed on Dec. 5, 1994, abandoned, for which priority is claimed under 35 U.S.C. 120.

BACKGROUND OF THE INVENTION

1. Field of the Invention

This invention relates to polymers suited for formation of contact lens. More specifically, this invention relates to organosilicone-polyalkylene glycol copolymers suitable for use in fabrication of soft contact lenses.

2. Description of the Related Art

Contact lenses may generally be classified into two categories. The first category, hard contact lenses, developed significantly in the 1940's with the advent of poly(methyl methacylate) lenses. Hard contact lenses have certain advantageous properties, but are generally less comfortable for the consumer. The second category, soft contact lenses, were developed primarily as a result of the discovery of poly-HEMA or poly(2-hydroxyethyl methacrylate). Although soft contact lenses improve patient comfort, such lenses suffer from durability problems. Further, soft lenses generally require a high water content in order to achieve sufficient oxygen permeability to maintain corneal health during extended wear periods.

One goal of soft contact lenses is high oxygen permeability. High oxygen permeability is required because the cornea replenishes depleted oxygen by absorbing oxygen from the tear film, whose oxygen originates from the surrounding air. A contact lens covering the cornea reduces oxygen availability to the cornea, unless the lens is sufficiently permeable to oxygen. Thus, substantial efforts have been devoted to producing contact lenses which are soft and have a high oxygen permeability.

Improvements in oxygen permeability have been achieved with the use of polysiloxane materials, especially polydimethylsiloxanes. However, these materials are inherently non-wettable, or hydrophobic. Polysiloxanes have been copolymerized with hydrophilic materials to produce contact lenses because the hydrophobic nature of polysiloxanes adversely affects patient comfort.

An example of a polysiloxane copolymer material suited to the formation of hard contact lenses is disclosed in European Patent Application Publication No. 0 108 886 A2 by inventors Leboeuf and Singer. This reference discloses a hard contact lens material which is a copolymer of (a) 15–40% tris(trimethylsiloxyl) methacryloxypropyl silane (i.e., TRIS), (b) 10–80% cross-linking agent, (c) up to 60% alkanol ester and/or hydrophilic monomer.

An example of a polysiloxane copolymer material suited to the formation of soft contact lenses is disclosed in European Patent Application Publication No. 0 493 320 A2 by inventors Mueller and Plankl. This reference discloses a soft contact lens material which is the copolymerization product of (a) 15–69.9% of a vinyl-telechelic polyether, (b) 30–84.9% of a fluorinated, ethylenically unsaturated monomer, a silicone-containing ethylenically unsaturated monomer, or a mixture thereof, (c) up to 40% of another ethylenically unsaturated monomer, and (d) 0.1 to 10% of a polyethylenically unsaturated comonomer (i.e., a cross-linking agent). The vinyl-telechelic polyether may include a polyethylene or polypropylene oxide. One of the preferred (b) monomers is tris (trimethylsiloxy-silyl) propyl methacrylate (i.e., TRIS).

One problem arising with the use of siloxanes (e.g., TRIS) in the formation of soft contact lenses is that the polymeric material includes cross-linking agents for increasing polymer durability. The addition of such cross-linking agents decreases the oxygen permeability (Dk) of the lenses. Thus, there is a continuing need for a soft contact lens having increased oxygen permeability and providing good patient comfort.

SUMMARY OF THE INVENTION

An object of the invention is provide a polymeric material suited to the formation of soft contact lenses having high oxygen permeability, good hydrophilicity, good durability, good visual clarity and patient comfort.

Another object of the invention is to provide a process for producing a soft contact lens in the substantial absence of added cross-linking agents, while maintaining high oxygen permeability and good durability.

One embodiment of the invention is a copolymer having good durability, high oxygen permeability, ocular biocompatibility, good optical clarity, and good hydrophilicity. The copolymer is formed from a monomer mixture including (a) 50 to 95 percent by weight vinylic reactive silicone having less than 20 silicon atoms and (b) 5 to 50 percent by weight divinylic polyalkylene glycol in the substantial absence of separate cross-linking agents. The copolymer may include a hydrophilicity modifier, such as a hydrophobe or hydrophile, to properly attenuate the hydrophilicity to the desired level. Preferably, the vinylic reactive silicone is 3-methacryloxypropyl tris(trimethylsiloxy) silane, while the preferred divinylic polyalkylene glycol is polypropylene glycol dimethacrylate.

Another embodiment of the invention is a hydrophilic (soft) contact lens formed from the aforementioned copolymer. The contact lens preferably includes 10 to 50 weight percent water and has a Dk/t of at least about 70 barrers/mm.

Still another embodiment of the invention is a process for forming a soft contact lens in the substantial absence of added cross-linking agent. The process involves first forming a mixture of a vinylic reactive silicone having up to 20 silicon atoms with a divinylic polyalkylene glycol in the substantial absence of additional cross-linking agents. The mixture is placed in a contact lens mold under conditions sufficient to polymerize the silicone and polyalkylene glycol monomers, thereby forming a soft contact lens. Contact lenses formed in accordance with this process preferably have a Dk/t of at least about 70 barrers/mm.

DESCRIPTION OF THE PREFERRED EMBODIMENTS

One embodiment of the invention is a copolymer having an advantageous balance of mechanical durability, oxygen permeability, and visual clarity. This polymeric material is useful in the formation of visual correction devices, preferably contact lenses, because of these advantageous properties. Another embodiment of the invention is a soft contact lens formed from the silicone/polyalkylene glycol copolymer. A third embodiment of the invention is a process for forming a contact lens having high oxygen permeability.

The monomers required in preparation of copolymers of the instant invention include (A) one or more vinylic-reactive silicones having less than 20 silicon atoms and (B) one or more difunctional polyalkylene glycol monomers.

The monomeric weight percentage of vinylic reactive silicone may range from about 50 to 95 percent, more preferably about 60 to 80 percent, while the weight percentage of polyalkylene glycol may range from about 5 to 50 percent, more preferably about 20 to 40 percent.

In one embodiment, the copolymer includes one or more hydrophilic modifiers, such as those disclosed in U.S. Pat. No. 4,921,956 (Molock, et al.), which are hereby incorporated by reference. The copolymer may include from about one to 40, more preferably about one to 30, weight percent hydrophilic modifier.

Advantageously, the copolymerization of the silicone-containing monomer and polyalkylene glycol is accomplished in the absence of added cross-linking agents. Although the difunctional polyalkylene glycol may function as a cross-linking agent itself, the polyalkylene glycol is intended primarily to copolymerize with the vinylic-reactive silicone. By polymerizing in the substantial absence of additional cross-linking agents, the present invention yields contact lenses having increased oxygen permeability (Dk) without adversely affecting durability as compared to prior art processes which require added cross-linking agents. Preferably, the present process is entirely free of added cross-linking agents.

A. Silicone-Containing Monomer (A):

"Vinylic-reactive silicones", as used herein, refers to monomers, oligomers, or macromers having siloxane groups and vinyl groups (unsaturated carbon—carbon double bonds) capable of reacting with other reactive groups to form a chemical bond with one of the carbon groups. The vinyl-reactive silicones useful in accordance with the present invention include those having less than about 20 silicon atoms, more preferably less than about 10 silicon atoms, and even more preferably less than 7 silicon atoms. Examples of such vinylic-reactive silicones include, without limitation thereto, 3-methacryloxypropyl tris (trimethylsiloxy) silane; 3-methacryloxypropyl-bis (trimethylsiloxy)methylsilane; and 3-methacryloxypropyl-pentamethyldisiloxane. A particularly preferred vinylic-reactive silicone is 3-methacryloxypropyl tris (trimethylsiloxy) silane [CAS No. 17096-07-0], also known as TRIS.

B. Difunctional Polyalkylene Glycol Monomer(B):

The difunctional polyalkylene glycol monomers useful in accordance with the present invention include, without limitation thereto, dimethacrylates of polyethylene glycols, dimethacrylates of polypropylene glycols, distyrenic-capped polyethylene glycols, distyrenic-capped polypropylene glycols, dimethacrylates of tetramethylene glycol and combinations thereof. Preferably the weight average molecular weight range of the polyalkylene glycol is about 425 to about 4000. Specifically, POLYPROPYLENE GLYCOL 4000, available from Dow Chemical (Midland, Mich.) is a particularly preferred polyalkylene glycol.

A dimethacrylate of a polyalkylene glycol can be prepared by mixing a methacrylate with the polyalkylene glycol in the presence of a catalyst at room temperature. For example, polypropylene glycol may be mixed with isocyantoethyl methacrylate in the presence of about 0.01 to 0.05 weight percent dibutyltin dilaurate catalyst. The resulting polypropylene glycol has methacrylate end groups which impart free radical addition polymerization reactivity to the adduct.

C. Hydrophilicity Modifiers:

Hydrophilicity modifiers useful in accordance with the present invention include hydrophobes and hydrophiles, with the latter being preferred. A preferred group of hydrophilic modifiers includes those defined by the formula

X-T-G wherein the hydrophilic group G typically has one or more free or etherified hydroxy groups, amino groups, amides, urethanes and/or other typically hydrophilic groups;

X is a polymerizable or reactive moiety selected from ethylenically unsaturated radicals, preferably vinyl, 1- or 2-lower alkyl vinyl, more preferably 1-methyl vinyl, or 2-methyl vinyl, or allyl;

and T is generally a divalent linking group which can be selected from a wide variety of divalent groups that can be linked both to G and to X. These hydrophilicity modifiers are described more fully in U.S. Pat. No. 4,921,956, which is incorporated herein by reference.

Other hydrophiles useful in accordance with the present invention include, without limitation thereto, monomers selected from the group consisting of dimethyl acrylamide, 2-hydroxyethyl methacrylate, N-vinyl pyrrolidone, ethylene glycol dimethacrylate, monomethacrylated polyethylene glycols, monomethacrylated polypropylene glycols, and mixtures thereof. Other hydrophobes useful in accordance with the present invention include, without limitation thereto, monomers selected from the group consisting of methyl methacrylate, vinylic-reactive fluorinated monomers, styrenic monomers, isobornyl methacrylate, hexafluoroisomethacrylate, and mixtures thereof.

D. Contact Lens Formation Process:

Contact lenses may be formed from the monomers aforementioned monomers by a variety of processes. Preferably, contact lenses are formed by polymerizing a prepolymerization mixture including the silicone, polyalkylene glycol, and optionally hydrophilic modifier, in a contact lens mold, which is preferably a double-sided lens mold. The polymerization may be initiated by addition of a polymerization initiator, such as DAROCUR® 1173, available from EM Chemicals (Hawthorne, N.J.).

The prepolymerization mixture may be prepared by admixing the desired monomers together with a solvent, such as, without limitation, isopropyl alcohol. Prior to the lens molding process, the monomer solution should be prepared and stored under conditions adverse to polymerization. Preferably, the monomer solution is polymerized shortly after application to the lens molding fixture.

The monomer solution may be prepared by admixing about 50 to 95 weight percent by weight vinylic reactive silicone to 5 to 50 weight percent by weight divinylic polyalkylene glycol, based on the weight of the monomers, in the presence of solvent. The solvent concentration should be sufficiently high to produce a monomer solution having a viscosity low enough to allow sufficient flow, while not so high that problems with subsequent solvent extraction processes result. The monomer solution may have about one to about ten weight percent solvent, more preferably two to five percent, based on total solution weight. Suitable solvents include isopropyl alcohol and methylethyl ketone.

A polymerization initiator, such as DAROCUR® 1173 may be added to the monomer mixture to initiate polymerization. The polymerization initiator is preferably added in an amount of up to about 0.05 gram per gram of total monomer, more preferably about 0.003 g/g monomer.

Thus, preparation of a contact lens in accordance with the present invention may occur by the following process. First, a vinylic reactive silicone having up to 20 silicon atoms is contacted with a divinylic polyalkylene glycol in the presence of solvent and a polymerization initiator, thereby forming a prepolymerization mixture. The prepolymerization mixture is placed in a contact lens mold, preferably double-sided, under conditions sufficient to cause copolymerization of the polyalkylene glycol with the silicone in the substantial absence of cross-linking agents. Ultraviolet light applied to the mixture at an intensity sufficient to initiate the polymerization process. The copolymerization process is allowed to proceed to completion in the substantial absence of added cross-linking agents, thereby yielding a contact lens having a shape defined substantially by the mold.

E. Oxygen Transmissibility and Permeability:

The cornea receives oxygen primarily from the corneal surface which is exposed to the environment, in contrast to other tissues which receives oxygen from blood flow. Thus, an ophthalmic lens which may be worn on the eye for extended periods of time must allow sufficient oxygen to permeate through the lens to the cornea to sustain corneal health. One result of the cornea receiving an inadequate amount of oxygen is that the cornea will swell. In a preferred embodiment, the oxygen transmissibility of the present ophthalmic lenses is sufficient to prevent any clinically significant amount of corneal swelling from occurring during the period of wear.

A preferred ophthalmic lens material will have an oxygen transmissibility, Dk/t, of at least 70 (cm$^3$ oxygen)(mm)/mm-cm$^2$×(sec/mm Hg)×10$^{-9}$ or [barrers/mm], more preferably at least 75 barrers/mm, and most preferably at least 87 barrers/mm.

It is believed that the theoretical limit of oxygen transmissibility of a polysiloxane contact lens is about 600 barrers/mm. As mentioned earlier, in order to maximize corneal health and comfort, it is desirable to maximize the oxygen transmissibility. Accordingly, a preferred range of oxygen transmissibility for the present lenses is 70 to 600 barrers/mm, a more preferred range is 75 to 600, and an even more preferred range is 87 to 600.

The oxygen permeability of a lens and oxygen transmissibility of a lens material may be determined by the following technique. Oxygen fluxes (J) are measured at 34 C in a wet cell (i.e., gas streams are maintained at about 100% relative humidity) using a Dk1000 instrument (available from Applied Design and Development Co., Norcross, Ga.), or similar analytical instrument. An air stream, having a known percentage of oxygen (e.g., 21%), is passed across one side of the lens at a rate of about 10 to 20 cm$^3$/min., while a nitrogen stream is passed on the opposite side of the lens at a rate of about 10 to 20 cm$^3$/min. The barometric pressure surrounding the system, $P_{measured}$, is measured. The thickness (t) of the lens in the area being exposed for testing is determined by measuring about 10 locations with a Mitotoya micrometer is VL-50, or similar instrument, and averaging the measurements. The oxygen concentration in the nitrogen stream (i.e., oxygen which diffuses through the lens) is measured using the DK1000 instrument. The oxygen permeability of the lens material, $D_k$, is determined from the following formula:

$$D_k = Jt/(P_{oxygen})$$

where J=oxygen flux [microliters O$_2$/cm$^2$-minute]

$P_{oxygen} = (P_{measured} - P_{water\ vapor}) \times (\% O_2$ in air stream) [mm Hg]=partial pressure of oxygen in the air stream $P_{measured}$=barometric pressure [mm Hg]

$P_{water\ vapor}$=0 mm Hg at 34 C (in a dry cell) [mm Hg]

$P_{water\ vapor}$=40 mm Hg at 34 C (in a wet cell) [mm Hg]

t=average thickness of the lens over the exposed test area [mm]

where $D_k$ is expressed in units of barrers, i.e., [(cc oxygen)(mm)/cm$^2$]×[sec/mm Hg]×10$^{-10}$.

The oxygen transmissibility ($D_k/t$) of the material may be calculated by dividing the oxygen permeability ($D_k$) by the average thickness (t) of the lens.

The previous disclosure will enable one having ordinary skill in the art to practice the invention. In order to better enable the reader to understand specific embodiments and the advantages thereof, reference to the following examples is suggested.

EXAMPLE 1

In order to impart reactivity, isocyantoethyl methacrylate end groups are bonded to polypropylene glycols having a range of molecular weights from about 425 to 4000. While maintaining anhydrous conditions, about 20 grams (about 0.05 g-mol) of POLYPROPYLENE GLYCOL 4000 (available from DOW CHEMICAL CO., Midland, Mich.) is added to a flame dried 500 mL 3-neck round bottom flask cooled to about 23EC. About 1.55 grams (about 0.01 g-mol) of isocyanatoethyl methacrylate (available from MONOMER POLYMER, INC., Windham, N.H.) and about 0.004 grams (about 0.02 weight percent) dibutyltin dilaurate catalyst (available from PHALTZ BAUER, Waterbury, Conn.) are added to the flask. The flask is gently manually swirled, then covered with foil to minimize light contact, and slowly mechanically stirred at room temperature in a nitrogen atmosphere overnight. The resulting polypropylene glycols, having methacrylate end groups, (polypropylene glycol dimethacrylate) have weight-average molecular weights of about 425 to 4000.

Polyethyleneglycol dimethacrylates having weight-average molecular weights of about 200, 400 and 600 are commercially available from Monomer Polymer Labs (Windham, N.H.).

EXAMPLE 2

Polypropylene glycol dimethacrylate ("PPG")having a molecular weight of about 4000 is prepared substantially as described in Example 1. About 0.80 grams of the polypropylene glycol dimethacrylate is added to about 1.2 grams of 3-methacryloxypropyltris (trimethylsiloxy) silane (i.e., TRIS, available from GELESTE, Tullytown, Pa.), and about 0.05 cc of DAROCUR® 1173 initiator. The resulting solution is mixed thoroughly and transferred into polypropylene double-sided contact lens molds. The solution is polymerized, or cured, in a nitrogen atmosphere by applying ultraviolet (UV) light at an intensity sufficient to drive the copolymerization to substantial completion after an application period of about 3 hours. The resultant contact lens is removed from the mold and hydrated.

Fully hydrated contact lenses prepared substantially in accordance with the previously-described procedure are evaluated for oxygen permeability. Oxygen fluxes (J) are measured at 34EC in a wet cell (i.e., gas streams are maintained at about 100% relative humidity) using a Dk1000 instrument (available from Applied Design and Development Co., Norcross, Ga.). An oxygen stream is passed across one side of the lens at a rate of about 20 cm$^3$/min., while a nitrogen stream is passed on the opposite side of the lens at a rate of about 15 cm$^3$/min. The oxygen concentration in the nitrogen stream (i.e., oxygen which diffuses through the lens) is measured at equilibrium conditions.

$D_k$, a measure of the oxygen permeability of a material, is then determined from the following formula:

$$D_k = Jt/(P_{oxygen})$$

where J=oxygen flux [microliters $O_2/cm^2$-minute]

$P_{oxygen} = (P_{measured} - P_{water\ vapor})(\% \ O_2$ in test gas) [mm Hg]

$P_{measured}$=barometric pressure [mm Hg]

$P_{water\ vapor}$=0 mm Hg at 34EC (in a dry cell) [mm Hg]

$P_{water\ vapor}$=40 K 1 mm Hg at 34EC (in a wet cell) [mm Hg]

t=thickness of lens material [mm]

where Dk, as reported herein, has units of [(cc $O_2$)(mm/$cm^2$)(cm/sec)(mmHg)×$10^{-10}$].

Fully hydrated contact lenses prepared in accordance with the procedures of Example 1 have a Dk of about 87 and a modulus of elasticity of about 1.6 megaPascals (MPa).

COMPARATIVE EXAMPLE 3

Polypropylene glycol dimethacrylate having a molecular weight of about 4000 is prepared substantially as described in Example 1. About 0.80 grams of the polypropylene glycol dimethacrylate (PPG) is added to about 1.1 grams of TRIS, about 0.10 grams ethyleneglycol dimethacrylate ("EDGMA", available from Sartomer, West Chester, Pa.) and about 0.05 cc of DAROCUR® 1173 initiator. The resulting solution is mixed thoroughly and transferred into polypropylene double-sided contact lens molds. The solution is polymerized, or cured, in a nitrogen atmosphere by applying ultraviolet (UV) light at an intensity sufficient to drive the copolymerization to substantial completion after an application period of about 3 hours. The resultant contact lens is removed from the mold and hydrated. Fully hydrated contact lenses prepared substantially in accordance with the procedures of Comparative Example 3 have a Dk of about 70 and a modulus of elasticity of about 10.9 MPa.

COMPARATIVE EXAMPLE 4

Polypropylene glycol dimethacrylate having a molecular weight of about 4000 is prepared substantially as described in Example 1. About 0.70 grams of the polypropylene glycol dimethacrylate (PPG) is added to about 1.2 grams of TRIS, about 0.10 grams EDGMA, and about 0.05 cc of DAROCUR® 1173 initiator. The resulting solution is mixed thoroughly and transferred into polypropylene double-sided contact lens molds. The solution is polymerized, or cured, in a nitrogen atmosphere by applying ultraviolet (UV) light at an intensity sufficient to drive the copolymerization to substantial completion after an application period of about 3 hours. The resultant contact lens is removed from the mold and hydrated. Fully hydrated contact lenses prepared substantially in accordance with the procedures of Comparative Example 4 have a Dk of about 45 and a modulus of elasticity of about 13.8 MPa.

Table I summarizes the characteristics of contact lenses formed in accordance with the procedures of Examples 2 and Comparative Examples 3 and 4.

TABLE I

| Example | Monomers | Dk | Modulus |
| --- | --- | --- | --- |
| 2 | 0.80 g PPG 4000<br>1.2 g TRIS | 87 | 1.6 |

TABLE I-continued

| Example | Monomers | Dk | Modulus |
| --- | --- | --- | --- |
| 3 | 0.80 g PPG 4000<br>1.1 g TRIS<br>0.10 g EDGMA | 70 | 10.9 |
| 4 | 0.70 g PPG 4000<br>1.2 g TRIS<br>0.10 g EDGMA | 45 | 13.8 |

Example 2 describes the preparation of a polypropyleneglycol-TRIS copolymer contact lens having a Dk of about 87. Examples 3 and 4 describe the preparation of similar contact lenses with the addition of ethyleneglycol dimethacrylate as a cross-linking agent that increases mechanical properties. The Dk achieved with added cross-linking agent is disadvantageously reduced in both Examples 3 and 4, in comparison to Example 2. However, the modulus of elasticity of the Example 2 contact lens remains acceptable in the absence of additional cross-linking agents.

Thus, Example 2 and Comparative Examples 3 and 4 illustrate that contact lenses having a higher oxygen permeability (Dk) and acceptable mechanical properties can be achieved by copolymerization of polyalkyleneglycol dimethacrylates with TRIS in the absence of additional conventional cross-linking agents, such as ethyleneglycol dimethacrylate (EDGMA).

EXAMPLE 5

Polypropylene glycol dimethacrylate having a molecular weight of about 4000 is prepared substantially as described in Example 1. About 0.59 grams of the polypropylene glycol dimethacrylate is added to about 0.70 grams of TRIS, about 0.01 grams of hydrophobic monomer hexafluoroisopropyl-methacrylate (i.e., "HFIM", available from Polysciences, Warrington, Pa.), and about 0.05 cc of DAROCUR® 1173 initiator. The resulting solution is mixed thoroughly and transferred into polypropylene double-sided contact lens molds. The solution is polymerized, or cured, in a nitrogen atmosphere by applying ultraviolet (UV) light at an intensity sufficient to drive the copolymerization to substantial completion after a period of about 3 hours. The resultant contact lens is removed from the mold and hydrated. Fully hydrated contact lenses prepared substantially in accordance with the procedures of Example 5 have a Dk of about 87.

EXAMPLE 6

Polypropylene glycol dimethacrylate having a molecular weight of about 4000 is prepared substantially in accordance with the procedure described in Example 1. About 0.29 grams of the polypropylene glycol dimethacrylate is added to about 0.70 grams of TRIS, about 0.01 grams of HFIM, and about 0.05 cc of DAROCUR 1173 initiator. The resulting solution is mixed thoroughly and transferred into polypropylene double-sided contact lens molds. The solution is cured in a nitrogen atmosphere by applying UV light for a period of about three hours. The resultant contact lens is removed from the mold and hydrated. Fully hydrated contact lenses prepared substantially in accordance with the previously-described procedure have a Dk of about 88.

EXAMPLE 7

Polypropylene glycol dimethacrylate having a molecular weight of about 4000 is prepared substantially in accordance with the procedure described in Example 1. About 0.28 grams of the polypropylene glycol dimethacrylate is added to about 0.70 grams of TRIS, about 0.02 grams of HFIM, and about 0.05 cc of DAROCUR 1173 initiator. The resulting solution is mixed thoroughly and transferred into polypropylene double-sided contact lens molds. The solution is cured in a nitrogen atmosphere by applying UV light for a period of about three hours. The resultant contact lens is removed from the mold and hydrated. Fully hydrated contact lenses prepared substantially in accordance with the previously-described procedure have a Dk of about 85.

EXAMPLE 8

Polypropylene glycol dimethacrylate having a molecular weight of about 4000 is prepared substantially in accordance with the procedure described in Example 1. About 0.30 grams of the polypropylene glycol dimethacrylate is added to about 0.70 grams of TRIS, about 0.02 grams of the hydrophobic monomer isobornylmethacrylate (Sartomer, West Chester, Pa.), about 0.03 grams isopropyl alcohol (J T Baker, Phillipsburg, N.J.), and about 0.05 cc of DAROCUR 1173 initiator. The resulting solution is mixed thoroughly and transferred into polypropylene double-sided contact lens molds. The solution is cured in a nitrogen atmosphere by applying UV light for a period of about three hours. The resultant contact lens is removed from the mold and hydrated. Fully hydrated contact lenses prepared substantially in accordance with the previously-described procedure have a Dk of about 85.

EXAMPLE 9

About 0.85 grams of the polyethyleneglycol dimethacrylate having a molecular weight of about 200 is added to about 0.15 grams of TRIS, about 0.10 grams of the hydrophobic monomer methyl methacrylate (Aldrich Chemical Co., Milwaukee, Wis.) and about 0.05 cc of DAROCUR® 1173 initiator. The resulting solution is mixed thoroughly and transferred into polypropylene double-sided contact lens molds. The solution is cured in a nitrogen atmosphere by applying UV light for a period of about three hours. The resultant contact lens is removed from the mold and hydrated.

EXAMPLE 10

Polypropylene glycol dimethacrylate having a molecular weight of about 4000 is prepared substantially in accordance with the procedure described in Example 1. About 0.20 grams of the polypropylene glycol dimethacrylate is added to about 0.70 grams of TRIS, about 0.10 grams of the hydrophilic monomer N-vinyl pyrollidone, and about 0.05 cc of DAROCUR 1173 initiator. The resulting solution is mixed thoroughly and transferred into polypropylene double-sided contact lens molds. The solution is cured in a nitrogen atmosphere by applying UV light for a period of about three hours. The resultant contact lens is removed from the mold and hydrated.

EXAMPLE 11

Polypropylene glycol dimethacrylate having a molecular weight of about 4000 is prepared substantially in accordance with the procedure described in Example 1. About 0.24 grams of the polypropylene glycol dimethacrylate is added to about 0.70 grams of TRIS, about 0.02 grams of N-vinyl pyrollidone, 0.04 grams isopropyl alcohol (Aldrich Chemical Co.) as solvent, and about 0.05 cc of DAROCUR 1173 initiator. The resulting solution is mixed thoroughly and transferred into polypropylene double-sided contact lens molds. The solution is cured in a nitrogen atmosphere by applying UV light for a period of about three hours. The material was cured an additional hour at a temperature of 60EC. The resultant contact lens is removed from the mold and hydrated. Fully hydrated contact lenses prepared substantially in accordance with the previously-described procedure have a Dk of about 78.

EXAMPLE 12

Polypropylene glycol dimethacrylate having a molecular weight of about 1200 is prepared substantially in accordance with the procedure described in Example 1. About 0.18 grams of the polypropylene glycol dimethacrylate is added to about 0.70 grams of TRIS, about 0.12 grams of the hydrophilic monomer hydroxyethyl methacrylate, and about 0.05 cc of DAROCUR 1173 initiator. The resulting solution is mixed thoroughly and transferred into polypropylene double-sided contact lens molds. The solution is cured in a nitrogen atmosphere by applying UV light for a period of about three hours. The resultant contact lens is removed from the mold and hydrated. Fully hydrated contact lenses prepared substantially in accordance with the previously-described procedure have a Dk of about 58.

EXAMPLE 13

Polypropyleneglycol dimethacrylate having a molecular weight of about 1200 is prepared substantially in accordance with the procedure described in Example 1. About 0.10 grams of the polypropyleneglycol dimethacrylate is added to about 1.0 grams of TRIS, about 0.10 grams hydroxyethyl methacrylate, about 0.10 grams methylethyl ketone solvent, and about 0.05 cc of DAROCUR 1173 initiator. The resulting solution is mixed thoroughly and transferred into polypropylene double-sided contact lens molds. The solution is cured in a nitrogen atmosphere by applying UV light for a period of about three hours. The resultant contact lens is removed from the mold and hydrated.

EXAMPLE 14

About 0.10 grams of the polyethyleneglycol dimethacrylate having a molecular weight of about 600 is added to about 1.0 grams of TRIS, about 0.60 grams of the hydrophilic monomer dimethacrylamide (Alcolac, Baltimore, Md.), and about 0.05 cc of DAROCUR 1173 initiator. The resulting solution is mixed thoroughly and transferred into polypropylene double-sided contact lens molds. The solution is cured in a nitrogen atmosphere by applying UV light for a period of about three hours. The resultant contact lens is removed from the mold and hydrated. Fully hydrated contact lenses prepared substantially in accordance with the previously-described procedure have a Dk of about 96.

EXAMPLE 15

Polypropylene glycol dimethacrylate having a molecular weight of about 4000 is prepared substantially in accordance with the procedure described in Example 1. About 0.30 grams of the polypropylene glycol dimethacrylate is added to about 0.70 grams of TRIS, about 0.025 grams of the hydrophilic monomer dimethacrylamide, about 0.025 grams isopropyl alcohol solvent, and about 0.05 cc of DAROCUR 1173 initiator. The resulting solution is mixed thoroughly and transferred into polypropylene double-sided contact lens molds. The solution is cured in a nitrogen atmosphere by applying UV light for a period of about three hours. The resultant contact lens is removed from the mold and hydrated. Fully hydrated contact lenses prepared substantially in accordance with the previously-described procedure have a Dk of about 98.

EXAMPLE 16

About 0.15 grams of polyethyleneglycol dimethacrylate having a molecular weight of about 200 is added to about 0.85 grams of TRIS, about 0.10 grams methylethyl ketone solvent, and about 0.05 cc of DAROCUR 1173 initiator. The resulting solution is mixed thoroughly and transferred into polypropylene double-sided contact lens molds. The solution is cured in a nitrogen atmosphere by applying UV light for a period of about three hours. The resultant contact lens is removed from the mold and hydrated.

EXAMPLE 17

Polypropylene glycol dimethacrylate having a molecular weight of about 1200 is prepared substantially in accordance with the procedure described in Example 1. About 0.30 grams of the polypropylene glycol dimethacrylate is added to about 1.0 grams of TRIS, and about 0.05 cc of DAROCUR 1173 initiator. The resulting solution is mixed thoroughly and transferred into polypropylene double-sided contact lens molds. The solution is cured in a nitrogen atmosphere by applying UV light for a period of about three hours. The resultant contact lens is removed from the mold and hydrated.

EXAMPLE 18

About 0.40 grams of polytetramethyleneglycol dimethacrylate having a molecular weight of about 1000 is added to about 1.40 grams of TRIS, about 0.40 grams of dimethyacrylamide, about 0.10 grams isopropyl alcohol solvent, and about 0.05 cc of DAROCUR 1173 initiator. The resulting solution is mixed thoroughly and transferred into polypropylene double-sided contact lens molds. The solution is cured in a nitrogen atmosphere by applying UV light for a period of about three hours. An additional curing is performed at about 60EC for about an hour. The resultant contact lens is removed from the mold and hydrated. Fully hydrated contact lenses prepared substantially in accordance with the previously-described procedure have a Dk of about 47.

EXAMPLE 19

Polypropyleneglycol dimethacrylate having a molecular weight of about 4000 is prepared substantially in accordance with the procedure described in Example 1. About 0.26 grams of the polypropyleneglycol dimethacrylate 4000 is added to about 0.040 grams polyethyleneglycol dimethacrylate having a molecular weight of about 600, about 0.70 grams of TRIS, about 0.02 grams isopropyl alcohol solvent, and about 0.05 cc of DAROCUR 1173 initiator. The resulting solution is mixed thoroughly and transferred into polypropylene double-sided contact lens molds.

The solution is cured in a nitrogen atmosphere by applying UV light for a period of about three hours. The resultant contact lens is removed from the mold and hydrated. Fully hydrated contact lenses prepared substantially in accordance with the previously-described procedure have a Dk of about 52.

EXAMPLE 20

Polypropylene glycol dimethacrylate having a molecular weight of about 4000 is prepared substantially in accordance with the procedure described in Example 1. About 3.0 grams of the polypropylene glycol dimethacrylate is added to about 7.0 grams of TRIS, about 0.05 grams isopropyl alcohol solvent, and about 0.05 cc of DAROCUR 1173 initiator. The resulting solution is mixed thoroughly and transferred into polypropylene double-sided contact lens molds. The solution is cured in a nitrogen atmosphere by applying UV light for a period of about three hours. An additional curing is performed at about 60EC for about an hour. The resultant contact lens is removed from the mold and hydrated. Fully hydrated contact lenses prepared substantially in accordance with the previously-described procedure have a Dk of about 58.

EXAMPLE 21

About 0.85 grams of polyethylene glycol dimethacrylate having a molecular weight of about 400 is added to about 0.15 grams of TRIS, about 0.10 grams of the hydrophobic monomer methyl methacrylate, about 0.05 grams of methyl ethyl ketone, and about 0.05 cc of DAROCUR 1173 initiator. The resulting solution is mixed thoroughly and transferred into polypropylene double-sided contact lens molds. The solution is cured in a nitrogen atmosphere by applying UV light for a period of about three hours. The resultant contact lens is removed from the mold and hydrated.

EXAMPLE 22

Polypropylene glycol dimethacrylate having a molecular weight of about 4000 is prepared substantially in accordance with the procedure described in Example 1. About 0.30 grams of the polypropylene glycol dimethacrylate is added to about 0.70 grams of TRIS, about 0.05 grams isopropyl alcohol solvent, and about 0.05 cc of DAROCUR 1173 initiator. The resulting solution is mixed thoroughly and transferred into polypropylene double-sided contact lens molds. The solution is cured in a nitrogen atmosphere by applying UV light for a period of about three hours. An additional curing is performed at about 60EC for about an hour. The resultant contact lens is removed from the mold and hydrated. Fully hydrated contact lenses prepared substantially in accordance with the previously-described procedure have a Dk of about 93.

EXAMPLE 23

About 0.30 grams of polyethylene glycol dimethacrylate having a molecular weight of about 200 is added to about 1.0 grams of TRIS, about 0.10 grams of the hydrophobic monomer methyl methacrylate, about 0.30 grams of the hydrophilic monomer dimethacrylamide, and about 0.05 cc of DAROCUR 1173 initiator. The resulting solution is mixed thoroughly and transferred into polypropylene double-sided contact lens molds. The solution is cured in a nitrogen atmosphere by applying UV light for a period of about three hours. The resultant contact lens is removed from the mold and hydrated.

EXAMPLE 24

Polypropylene glycol dimethacrylate having a molecular weight of about 4000 is prepared substantially in accordance with the procedure described in Example 1. About 0.18 grams of the polypropylene glycol dimethacrylate is added to about 0.70 grams of TRIS, about 0.02 grams of the hydrophilic monomer hydroxyethyl methacrylate, about 0.10 grams of the hydrophilic monomer dimethacrylamide, and about 0.05 cc of DAROCUR 1173 initiator. The resulting solution is mixed thoroughly and transferred into polypropylene double-sided contact lens molds. The solution is cured in a nitrogen atmosphere by applying UV light for a period of about three hours. The resultant contact lens is removed from the mold and hydrated. Fully hydrated contact lenses prepared substantially in accordance with the previously-described procedure have a Dk of about 32.

Table II summarizes the oxygen permeability results described in Examples 5-24.

TABLE II

| Example | Monomers | Dk |
|---------|----------|-----|
| 5 | 0.59 g PPG 4000<br>0.70 g TRIS<br>0.01 g HFIM | 87 |
| 6 | 0.29 g PPG 4000<br>0.70 g TRIS<br>0.01 g HFIM | 88 |
| 7 | 0.28 g PPG 4000<br>0.70 g TRIS<br>0.02 g HFIM | 85 |
| 8 | 0.30 g PPG 4000<br>0.70 g TRIS<br>0.02 g HFIM | 85 |
| 11 | 0.24 g PPG 4000<br>0.70 g TRIS<br>0.02 g NVP | 78 |
| 12 | 0.18 g PPG 1200<br>0.70 g TRIS<br>0.12 g HEMA | 58 |
| 14 | 0.10 g PEG 600<br>1.0 g TRIS<br>0.60 g DMA | 28 |
| 15 | 0.30 g PPG 4000<br>0.70 g TRIS<br>0.025 g DMA | 96 |
| 18 | 0.40 g PTG 1000<br>1.40 g TRIS<br>0.40 g DMA | 47 |
| 19 | 0.26 g PPG 4000<br>0.04 g PEG 600<br>0.70 g TRIS | 52 |
| 20 | 3.0 g PPG 4000<br>7.0 g TRIS | 58 |
| 22 | 0.30 g PPG 4000<br>0.70 g TRIS | 93 |
| 24 | 0.18 g PPG 4000<br>0.70 g TRIS<br>0.02 g HEMA<br>0.01 g DMA | 32 |

Examples 5-24 illustrate variations in formulations which may be achieved in accordance with the present invention. Persons having ordinary skill in the art of hydrophilic contact lens fabrication will be capable of formulating numerous other compositions without departing from the scope of the present invention.

The invention has been described in detail, with reference to certain preferred embodiments, in order to enable the reader to practice the invention without undue experimentation. However, a person having ordinary skill in the art will readily recognize that many of the previous components and parameters may be varied or modified to a certain extent without departing from the scope and spirit of the invention. Furthermore, titles, headings, or the like are provided to enhance the reader's comprehension of this document, and should not be read as limiting the scope of the present invention. Accordingly, the intellectual property rights to this invention are defined only by the following claims and reasonable extensions and equivalents thereof.

That which is claimed is:

1. A copolymer having high oxygen permeability, ocular biocombatibility and visual clarity, said copolymer being formed from monomers comprising:

(a) 50 to 95 percent by weight vinylic reactive silicone having up to 20 silicon atoms; and (b) 5 to 50 percent by weight divinylic polyalkylene glycol, wherein said copolymer is formed in the substantial absence of addition cross-linking agents, and wherein said copolymer has a Dk/t of at least about 87 barrers/mm.

2. A copolymer of claim 1, wherein said vinylic reactive silicone has less than 10 silicon atoms.

3. A copolymer of claim 1, wherein said vinylic reactive silicone has less than 7 silicon atoms.

4. A copolymer of claim 3, wherein said vinylic reactive silicone is selected from the group consisting of 3-methacryloxypropyl tris(trimethylsiloxy) silane; 3-methacryloxypropyl-bis(trimethylsiloxy)methylsilane; 3-methacryloxypropyl-pentamethyldisiloxane; and mixtures thereof.

5. A copolymer of claim 4, wherein said vinylic reactive silicone is 3-methacryloxypropyl tris(trimethylsiloxy) silane.

6. A copolymer of claim 1, wherein said divinylic polyalkylene glycol is selected from the group consisting of dimethacrylates of polyethylene glycols, dimethacrylates of polypropylene glycols, distyrenic-capped polyethylene glycols, distyrenic-capped polypropylene glycols, dimethacrylates of tetramethylene glycol and combinations thereof.

7. A copolymer of claim 6, wherein said divinylic polyalkylene glycol is a polypropylene glycol dimethacrylate.

8. A copolymer of claim 6, wherein said divinylic polyalkylene glycol has a weight average molecular weight of 425 to 4000.

9. A copolymer of claim 1, further comprising 1 to 40 percent by weight of a hydrophilic monomer.

10. A copolymer of claim 9, wherein said hydrophilic monomer is selected from the group consisting of dimethyl acrylamide, 2-hydroxyethyl methacrylate, N-vinyl pyrrolidone, ethylene glycol dimethacrylate, monomethacrylated polyethylene glycols, monomethacrylated polypropylene glycols, and mixtures thereof.

11. A copolymer of claim 1, further comprising 1 to 40 percent by weight of a hydrophobic monomer.

12. A copolymer of claim 11, wherein said hydrophobic monomer is selected from the group consisting of methyl methacrylate, vinylic-reactive fluorinated monomers, styrenic monomers, isobornyl methacrylate, and mixtures thereof.

13. A copolymer of claim 1, comprising 60 to 80 weight percent of said vinylic silicone and 20 to 40 weight percent of said divinylic polyalkylene glycol.

14. A hydrophilic contact lens formed from monomers comprising:

(a) 50 to 95 percent by weight vinylic reactive silicone having up to 20 silicon atoms; and (b) 5 to 50 percent by weight divinylic polyalkylene glycol, wherein said contact lens is formed in the substantial absence of addition cross-linking agents, and wherein said lens has a Dk/t of at least about 70 barrers/mm.

15. A contact lens of claim 14, formed from monomers comprising:

(a) 50 to 95 percent by weight 3-methacryloxypropyl tris(trimethylsiloxy) silane; and (b) 5 to 50 percent by weight polypropyleneglycol dimethacrylate.

16. A contact lens of claim 14, consisting essentially of:
(a) 50 to 95 weight percent vinylic reactive silicone having up to 20 silicon atoms;
(b) 5 to 50 weight percent divinylic polyalkylene glycol; and
(c) 1 to 40 weight percent hydrophilicity modifier.

17. A contact lens of claim 14, wherein said lens has a Dk/t of at least about 75 barrers/mm.

18. A process for making a soft contact lens in the substantial absence of added cross-linking agents, comprising the steps of:
(a) contacting a vinylic reactive silicone having up to 20 silicon atoms with a divinylic polyalkylene glycol in the substantial absence of additional cross-linking agents, thereby forming a prepolymerization mixture;
(b) placing said prepolymerization mixture and a polymerization initiator in a contact lens mold under conditions sufficient to cause copolymerization of the polyalkylene glycol with the silicone in the substantial absence of additional cross-linking agents; and
(c) copolymerizing said polyalkylene glycol and said silicone; and
(d) allowing said copolymerization to proceed in the substantial absence of cross-linking agents for a period of time sufficient to yield a contact lens,
wherein said lens has a Dk/t of at least about 87 barrers/mm.

19. A process of claim 18, in which said vinylic reactive silicone includes less than 10 silicon atoms.

20. A process of claim 19, in which said vinylic reactive silicone includes less than 7 silicon atoms.

21. A process of claim 20, in which said vinyl reactive silicone is selected from the group consisting of 3-methacryloxypropyl tris(trimethylsiloxy) silane; 3-methacryloxypropyl-bis(trimethylsiloxy)methylsilane; and 3-methacryloxypropyl-pentamethyldisiloxane and mixtures thereof, and said polyalkylene glycol is selected from the group consisting of dimethacrylates of polyethylene glycols, dimethacrylates of polypropylene glycols, distyrenic-capped polyethylene glycols, distyrenic-capped polypropylene glycols, dimethacrylates of tetramethylene glycol and combinations thereof.

22. A process of claim 21, in which said vinyl reactive silicone is 3-methacryloxypropyl tris(trimethylsiloxy) silane and said polyalkylene glycol is polypropylene glycol.

23. A process of claim 18, in which said copolymerization product comprises:
(a) 50 to 95 percent by weight vinylic reactive silicone having up to 10 silicon atoms; and
(b) 5 to 50 percent by weight divinylic polyalkylene glycol.

24. A process of claim 18, further comprising the step of adding a hydrophilic or hydrophobic monomer to said prepolymerization mixture in order to modify the hydrophilic nature of said contact lens.

* * * * *